United States Patent
Takatsuka

(10) Patent No.: US 8,907,931 B2
(45) Date of Patent: Dec. 9, 2014

(54) ELECTRONIC TERMINAL, INPUT CORRECTION METHOD, AND PROGRAM

(75) Inventor: Susumu Takatsuka, Tokyo (JP)

(73) Assignees: Sony Corporation, Tokyo (JP); Sony Mobile Communication Inc., Tokyo (JP)

( * ) Notice: Subject to any disclaimer, the term of this patent is extended or adjusted under 35 U.S.C. 154(b) by 277 days.

(21) Appl. No.: 13/469,572

(22) Filed: May 11, 2012

(65) Prior Publication Data

US 2012/0320000 A1 Dec. 20, 2012

Related U.S. Application Data

(60) Provisional application No. 61/498,805, filed on Jun. 20, 2011.

(51) Int. Cl.

| G06F 3/041 | (2006.01) |
| --- | --- |
| G09G 5/08 | (2006.01) |
| G09G 5/00 | (2006.01) |
| G06F 3/0346 | (2013.01) |
| G06F 3/0354 | (2013.01) |
| G06F 1/16 | (2006.01) |

(52) U.S. Cl.
CPC .......... *G06F 3/03545* (2013.01); *G06F 3/0346* (2013.01); *G06F 1/1684* (2013.01); *H04M 2250/12* (2013.01); *G06F 1/1626* (2013.01)
USPC ............ 345/179; 345/173; 345/158; 345/659

(58) Field of Classification Search
USPC .......... 345/173–179, 87, 103, 659, 156, 157; 715/760, 810; 178/18.01, 18.02
See application file for complete search history.

(56) References Cited

U.S. PATENT DOCUMENTS

| 2005/0091297 | A1* | 4/2005 | Sato et al. ...................... 708/442 |
| 2007/0195070 | A1* | 8/2007 | Takahashi et al. ............. 345/179 |
| 2009/0009489 | A1* | 1/2009 | Lee ................. 345/179 |
| 2010/0103133 | A1* | 4/2010 | Park et al. ...................... 345/173 |
| 2010/0234077 | A1* | 9/2010 | Yoo et al. ...................... 455/566 |
| 2010/0315385 | A1* | 12/2010 | Gan et al. ...................... 345/179 |
| 2013/0328836 | A1* | 12/2013 | Lee ................. 345/177 |
| 2014/0071069 | A1* | 3/2014 | Anderson et al. ............. 345/173 |

FOREIGN PATENT DOCUMENTS

JP 2006-309474 11/2006

* cited by examiner

*Primary Examiner* — Kent Chang
*Assistant Examiner* — Nelson Rosario
(74) *Attorney, Agent, or Firm* — Oblon, Spivak, McClelland, Maier & Neustadt, L.L.P.

(57) ABSTRACT

An information processing apparatus that includes a first sensor that receives a first type of signal; second and third sensors that receive a second type of signal; a control unit that calculates a position of a source from which a signal of the first type and a signal of the second type are transmitted based on a first time at which the signal of the first type is received at the first sensor, a second time at which the signal of the second type is received at the second sensor and a third time at which the signal of the second type is received at the third sensor; and a display that displays an image corresponding to a path obtained based on changes in position of the source calculated by the control unit.

17 Claims, 11 Drawing Sheets

ELECTRONIC TERMINAL, INPUT CORRECTION METHOD, AND PROGRAM

CROSS REFERENCE TO RELATED APPLICATION

The present application claims the benefit of the earlier filing date of U.S. Provisional Patent Application Ser. No. 61/498,805 filed on Jun. 20, 2011, the entire contents of which is incorporated herein by reference.

BACKGROUND

1. Field of the Disclosure

The present disclosure relates to an electronic terminal including a display unit, an input correction method performed in the electronic terminal, and a program for achieving the input correction method.

2. Description of Related Art

Various processing operations of electronically reading a picture or a character handwritten on paper or the like to obtain image data or character data have been performed.

In this case, a method of preparing an input pen designed for handwriting detection as a writing implement and causing a receiver near the input pen to detect handwriting obtained by the movement of the input pen on paper is actually used.

For example, Japanese Unexamined Patent Application Publication No. 2006-309474 describes an example in which an input pen is configured to output an infrared signal and an ultrasonic signal from a leading end thereof at the same time and a receiver disposed near the input pen receives the infrared signal and the ultrasonic signal and detects handwriting. In this case, the receiver performs processing for detecting the position of the leading end of the pen on the basis of the difference between a time at which the infrared signal is received and a time at which the ultrasonic signal is received. By repeatedly performing this position detection processing at short intervals, the change in the position of the leading end of the pen is detected and handwriting is detected.

Any handwriting detection receiver having a function of receiving an infrared signal and an ultrasonic signal may be used. For example, when a radiotelephone terminal called smartphone has a function of receiving an infrared signal and an ultrasonic signal, the radiotelephone terminal can have a handwriting detection function.

SUMMARY

In the above-described detection of handwriting input by an input pen which is performed using an infrared signal and an ultrasonic signal, it is necessary to reduce the change in positional relationship between paper on which writing is performed and a receiver. That is, in processing for detecting handwriting input by an input pen using an infrared signal and an ultrasonic signal, when a receiver is moved, a relative position to be detected is changed and a handwriting detection condition is disturbed. This is caused because relative positions of the input pen and the receiver are detected in the handwriting detection processing.

When the handwriting detection condition is disturbed by the change in the position of the receiver, it is difficult to accurately detect handwriting. Detected handwriting differs from a picture or a character actually written on paper with an input pen.

It is an object of the present disclosure to appropriately detect handwriting even when the relative positions of a writing implement for transmitting a signal and a receiver for receiving the signal transmitted from the writing implement at a position near the writing implement are changed.

According to a first embodiment, the disclosure is directed to an information processing apparatus that includes a first sensor that receives a first type of signal; second and third sensors that receive a second type of signal; a control unit that calculates a position of a source from which a signal of the first type and a signal of the second type are transmitted based on a first time at which the signal of the first type is received at the first sensor, a second time at which the signal of the second type is received at the second sensor and a third time at which the signal of the second type is received at the third sensor; and a display that displays an image corresponding to a path obtained based on changes in position of the source calculated by the control unit.

According to another exemplary embodiment, the disclosure is directed to a method performed by an information processing apparatus. The method including receiving a first type of signal transmitted from a source at a first sensor at a first time; receiving a second type of signal transmitted from a source at a second sensor at a second time; receiving the second type of signal transmitted from the source at a third sensor at a third time; calculating a position of the source based on the first time, the second time, and the third time; and displaying an image corresponding to a path obtained based on changes in position of the source calculated by the control unit.

According to another exemplary embodiment, the disclosure is directed to a non-transitory computer-readable medium including computer program instructions, which when executed by an information processing apparatus, causes the information processing apparatus to perform a method. The method including receiving a first type of signal transmitted from a source at a first sensor at a first time; receiving a second type of signal transmitted from a source at a second sensor at a second time; receiving the second type of signal transmitted from the source at a third sensor at a third time; calculating a position of the source based on the first time, the second time, and the third time; and displaying an image corresponding to a path obtained based on changes in position of the source calculated by the control unit.

According to the present disclosure, even when an apparatus for receiving a signal of a first type and a signal of a second type is moved, it is possible to continuously perform correct handwriting display without disturbing the detected position of a writing implement since correction processing is performed.

DETAILED DESCRIPTION

An exemplary embodiment of the present disclosure will be described in the following order.
1. Exemplary Entire Configuration of System (FIG. 1)
2. Exemplary Configuration of Electronic Terminal (FIG. 2)
3. Exemplary Configuration of Writing Implement (FIG. 3)
4. Example of Usage Pattern (FIG. 4)
5. Description of Correction Process (FIGS. 5 to 8)
6. Description of Distance Display Process (FIGS. 9 and 10)
7. Modification (FIG. 11)
1. Exemplary Entire Configuration of System FIG. 1 is a diagram illustrating an example of a system according to an embodiment of the present disclosure (hereinafter referred to as "this example").

Figure 1:
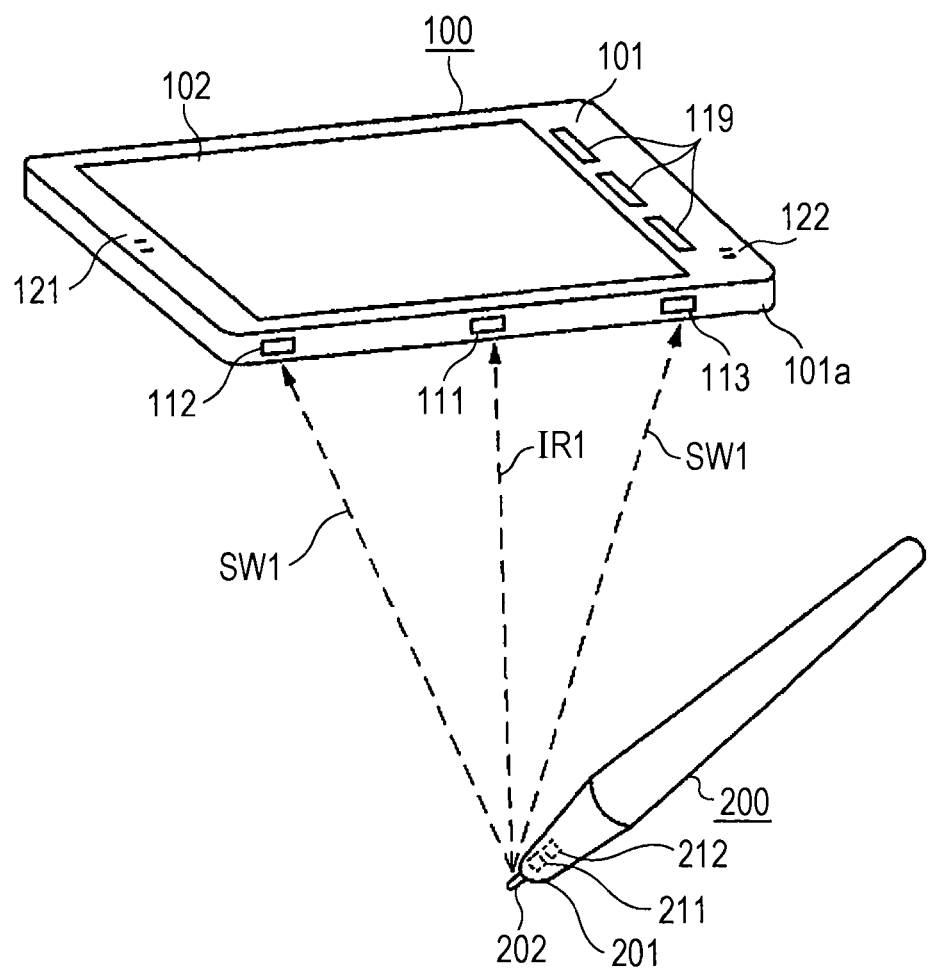
FIG. 1 is a perspective view illustrating an example of a system according to an embodiment of the present disclosure.

In this example, as illustrated in FIG. 1, an electronic terminal 100 and an input pen 200 are prepared. The electronic terminal 100 is a radiotelephone terminal called smartphone whose functionality can be increased by installing various pieces of application software into the radiotelephone terminal. On the surface of a casing 101 of the electronic terminal 100, a display unit 102 that is a relatively large display panel is disposed. As the display unit 102, a display device such as a liquid crystal display panel or an organic electroluminescence (EL) display panel is used.

On the surface of the electronic terminal 100, operation keys included in an operation unit 119, a call speaker 121, and a microphone 122 are further disposed.

On a side surface 101a of the casing 101 of the electronic terminal 100, three sensors 111, 112, and 113 are aligned in a substantially linear array. That is, at the substantially center of the side surface 101a, the infrared sensor 111 for receiving an infrared signal is disposed. The first ultrasonic sensor 112 is disposed at a position apart from the infrared sensor 111 by a predetermined distance on the left side of the infrared sensor 111. The second ultrasonic sensor 113 is disposed at a position apart from the infrared sensor 111 by a predetermined distance on the right side of the infrared sensor 111. The distance between the infrared sensor 111 and each of the ultrasonic sensors 112 and 113 is, for example, several centimeters.

The input pen 200 is a writing implement such as a ballpoint pen used for writing on paper near the electronic terminal 100. A pen tip switch 202 is disposed at a leading end 201 of the input pen 200. When the leading end of the pen is brought into contact with paper or the like, the pen tip switch 202 is turned on. Inside the leading end 201 of the input pen 200, an infrared transmission unit 211 and an ultrasonic oscillation unit 212 are disposed. During the pen tip switch 202 is in an ON state, the infrared transmission unit 211 periodically transmits an infrared signal and the ultrasonic oscillation unit 212 periodically oscillates an ultrasonic signal. The transmission of an infrared signal and the oscillation of an ultrasonic signal are performed at the same time.

There is a mode in which the measurement of the position of the leading end of the pen is continued by continuously transmitting an infrared signal and an ultrasonic signal regardless of whether the pen tip switch is in the ON or OFF state. As a method of notifying a body of information about the ON or OFF state of the pen tip switch, a method of changing the frequencies of an infrared signal and an ultrasonic signal may be used.

As illustrated in FIG. 1, an infrared signal IR1 transmitted from the input pen 200 is detected by the infrared sensor 111 in the electronic terminal 100. An ultrasonic signal SW1 oscillated by the input pen 200 is detected by the first ultrasonic sensor 112 and the second ultrasonic sensor 113 in the electronic terminal 100.

The infrared signal IR1 and the ultrasonic signal SW1 are output from the input pen 200 at the same time. However, since speeds at which these signals are transmitted in space differ from each other, the ultrasonic signal SW1 is detected by the two ultrasonic sensors 112 and 113 after the infrared signal IR1 has been detected by the infrared sensor 111. On the basis of the detection time difference between the infrared signal IR1 and the ultrasonic signal SW1, the distance between the input pen 200 and the side surface 101a of the electronic terminal 100 is determined.

In accordance with the position of the input pen 200, the time at which the ultrasonic signal SW1 is detected by the first ultrasonic sensor 112 and the time at which the ultrasonic signal SW1 is detected by the second ultrasonic sensor 113 are changed. When the ultrasonic signal SW1 is detected by the two ultrasonic sensors 112 and 113 at the same time, the two ultrasonic sensors 112 and 113 are at the same distance from the input pen 200. On the other hand, when the ultrasonic signal SW1 is detected by the two ultrasonic sensors 112 and 113 at different times, there is a difference in the distance from the input pen 200 between the two ultrasonic sensors 112 and 113 which is changed in accordance with the time difference.

Accordingly, the position of the leading end of the input pen 200 as viewed from the electronic terminal 100 is calculated on the basis of the difference between a time at which the infrared signal IR1 is detected and a time at which the ultrasonic signal SW1 is detected and the difference between times at which the ultrasonic signal SW1 is detected by the two ultrasonic sensors 112 and 113.

By detecting the infrared signal IR1 and the ultrasonic signal SW1 output from the leading end 201 of the input pen 200 at periodic intervals (e.g. several tens of times per second), the position of the leading end of the pen is detected at short intervals. By connecting the positions that have been detected at short intervals and generating a continuous line, handwriting recorded on paper with the input pen 200 is detected. The detected handwriting is displayed on the display unit 102 and is stored in the electronic terminal 100 as image data.

2. Exemplary Configuration of Electronic Terminal

Next, an exemplary configuration of the electronic terminal 100 will be described with reference to a block diagram in FIG. 2.

The electronic terminal 100 includes a communication processing unit 115 for performing radio processing as a radiotelephone terminal. An antenna 116 is connected to the communication processing unit 115, and the communication processing unit 115 performs radio communication with a radiotelephone base station via the antenna 116. The communication processing unit 115 performs speech communication and data communication under the control of the control unit 117. For example, at the time of speech communication, transmission data and receiving data are transmitted between the communication processing unit 115 and the speech processing unit 120, and communication is performed using the speaker 121 and the microphone 122 connected to the speech processing unit 120. At the time of data communication, a memory 118 stores data received by the communication processing unit 115, and an image and text are displayed on the display unit 102 on the basis of display data. Transmission data stored in the memory 118 is wirelessly transmitted from the communication processing unit 115.

As illustrated in FIG. 1, the electronic terminal 100 includes the infrared sensor 111, the first ultrasonic sensor 112, and the second ultrasonic sensor 113, and supplies data detected by each of these sensors to the control unit 117 via an internal bus line. The infrared sensor 111 is a sensor functioning as a receiving unit for receiving an infrared signal transmitted from the input pen 200. The first ultrasonic sensor 112 and the second ultrasonic sensor 113 are sensors functioning as receiving units for receiving an ultrasonic signal transmitted from the input pen 200.

The control unit 117 performs processing for calculating the position of the input pen 200 on the basis of pieces of data of detection performed by the sensors 111, 112, and 113. When the control unit 117 calculates the position of the input pen 200, data of handwriting obtained by the change in the calculated position is stored in the memory 118 and is displayed on the display unit 102. This storage processing and this display processing are performed by causing the control unit 117 to execute a program (software) stored in the memory 118.

The infrared sensor 111 and the ultrasonic sensors 112 and 113 may be used in an application other than the detection of the position of the input pen 200. For example, using the infrared sensor 111, the electronic terminal 100 may perform data communication with another terminal near the electronic terminal 100.

The electronic terminal 100 further includes an acceleration sensor 114 that is an acceleration detection unit for detecting acceleration applied to the electronic terminal 100, and supplies data of detection performed by the acceleration sensor 114 to the control unit 117. The control unit 117 detects the movement of the electronic terminal 100 on the basis of the supplied data of acceleration detection.

The operation unit 119 included in the electronic terminal 100 sets an operation mode performed by the control unit 117. For example, the operation unit 119 can set a mode in which storage and display of handwriting input with the input pen 200 are performed. Furthermore, the operation unit 119 can set a reset mode in which a terminal position is reset. This reset mode will be described later.

A display panel with a touch panel may be used as the display unit 102 included in the electronic terminal 100, and the operation unit 119 may output an operation instruction when a touch operation performed on the display panel is detected.

3. Exemplary Configuration of Writing Implement

Next, the configuration of the input pen 200 that is a writing implement with which a user performs writing by hand will be described with reference to FIG. 3.

The input pen 200 includes the pen tip switch 202 that is turned on when a writing operation is performed on paper or the like. When the control unit 213 detects that the pen tip switch 202 has been turned on, the transmission of an infrared signal from the infrared transmission unit 211 and the oscillation of an ultrasonic signal from the ultrasonic oscillation unit 212 are periodically performed in conjunction with each other. When the pen tip switch 202 is turned off, the control unit 213 terminates the transmission of an infrared signal from the infrared transmission unit 211 and the oscillation of an ultrasonic signal from the ultrasonic oscillation unit 212.

Figure 3:
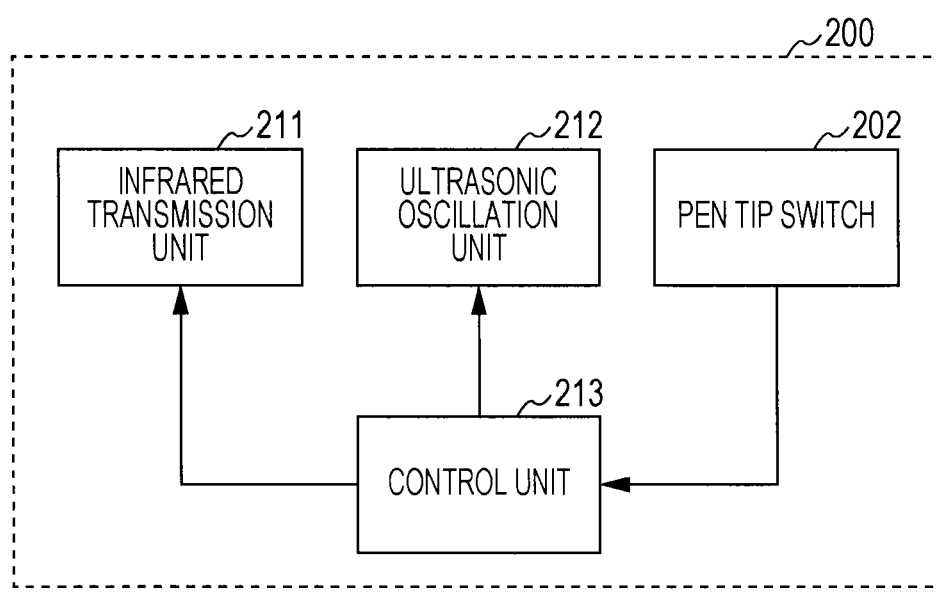
FIG. 3 is a block diagram illustrating an exemplary configuration of a writing implement according to an embodiment of the present disclosure.

Although not illustrated in FIG. 3, the input pen 200 further has a function of a typical writing implement such as a ball-point pen.

4. Example of Usage Pattern

Figure 4:
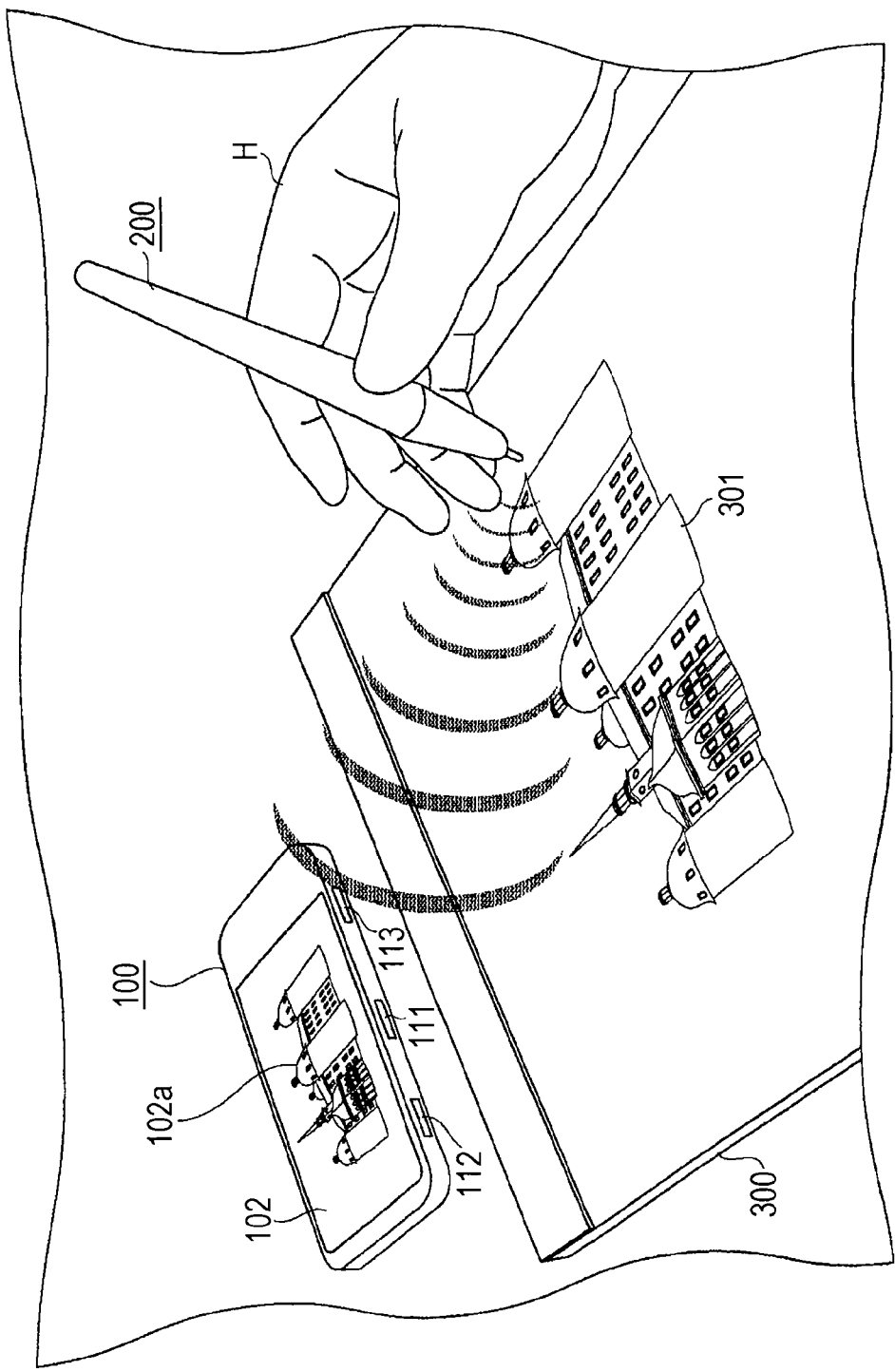
FIG. 4 is a diagram describing an example of a usage pattern according to an embodiment of the present disclosure.

FIG. 4 illustrates an example of a usage pattern of the input pen 200 and the electronic terminal 100 when a handwriting input is performed with the input pen 200 and the electronic terminal 100.

In the example illustrated in FIG. 4, a user draws a certain picture (figure) on a notebook 300 with the input pen 200 held by a hand H.

On the upper side of the notebook 300, the electronic terminal 100 is disposed. At that time, the electronic terminal 100 is placed so that the side surface 101a on which the sensors 111, 112, and 113 are disposed faces the notebook 300.

When a handwriting display mode is set in the electronic terminal 100 in the state illustrated in FIG. 4, the electronic terminal 100 detects handwriting input with the input pen 200. Accordingly, the electronic terminal 100 detects handwriting of a picture 301 that a user has handwritten on the notebook 300 with the input pen 200, and an image 102a that is the same as the picture 301 is displayed on the display unit 102. In the example illustrated in FIG. 4, the image 102a displayed on the display unit 102 is a reduced image of the picture 301 that has been handwritten.

When the electronic terminal 100 according to this example is moved while performing handwriting detection illustrated in FIG. 4, the electronic terminal 100 performs processing for correcting the position thereof relative to the input pen. When the control unit 117 determines that acceleration larger than a predetermined threshold value has been detected on the basis of data of detection performed by the acceleration sensor 114 (FIG. 2) included in the electronic terminal 100, a program for position correction processing is started. When the operation unit 119 included in the electronic terminal 100 sets the reset mode, the program for position correction processing can also be started.

5. Description of Correction Process

Figure 5:
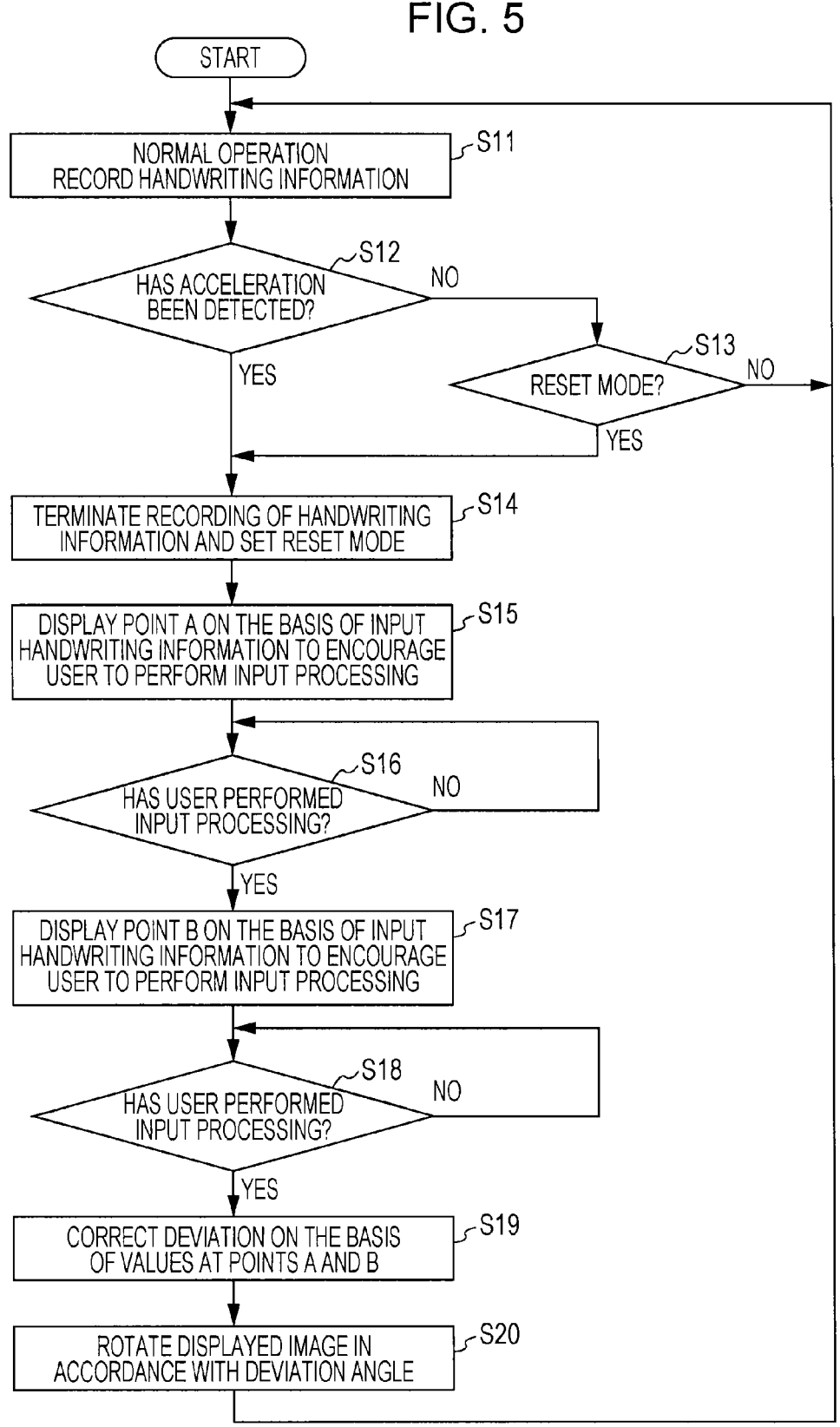
FIG. 5 is a flowchart illustrating an example of a correction process according to an embodiment of the present disclosure.

FIG. 5 is a flowchart illustrating a position correction process performed under the control of the control unit 117.

First, the control unit 117 performs processing for calculating the position of the input pen 200 in the handwriting display mode. In a state in which the storage and display of handwriting input at the detected position are performed (step S11), acceleration detection processing is performed on the basis of the output of the acceleration sensor 114 and it is determined whether acceleration larger than a threshold value has been detected (step S12). When acceleration larger than the threshold value is not been detected, it is determined whether an operation of setting a reset mode has been performed (step S13). When the operation of setting the reset mode is not performed, the process returns to step S11 in which the storage and display of handwriting is continuously performed. It is assumed that the storage and display of handwriting in step S11 is performed in an exemplary state illustrated in FIG. 4 in which writing is performed on the notebook 300 with the input pen 200.

When it is determined in step S12 that acceleration larger than the threshold value has been detected and it is determined in step S13 that the operation of setting the reset mode has been performed, the process proceeds to step S14 in which the detection and storage of writing information are terminated and the reset mode is started.

When the reset mode is started, the control unit 117 determines a first singular point (hereinafter referred to as a point A) on a current writing image displayed in step S11 and displays an image on which the point A is identifiable on the display unit 102 (step S15). At that time, for example, it is desired that a mark indicating the point A and a character or sign encouraging a user to touch the point A with the input pen 200 be displayed on the image.

When a user sees the displayed image, the user checks the point A on the displayed image, searches the picture 301 on the notebook 300 for the point A, and touches the point A with the leading end of the input pen 200.

The control unit 117 included in the electronic terminal 100 waits until an infrared signal and an ultrasonic signal transmitted from the input pen 200 are detected. When an infrared signal and an ultrasonic signal transmitted from the input pen 200 are detected, the process proceeds (step S16).

Next, the control unit 117 determines a second singular point (hereinafter referred to as a point B) on a currently displayed writing image and displays an image on which the point B is identifiable on the display unit 102 (step S17). In this case, it is also desired that a character or sign encouraging a user to touch the point B with the input pen 200 be displayed on the image.

When a user sees the displayed image, the user checks the point B on the displayed image, searches the picture 301 on the notebook 300 for the point B, and touches the point B with the leading end of the input pen 200.

The control unit 117 included in the electronic terminal 100 waits until an infrared signal and an ultrasonic signal transmitted from the input pen 200 are detected. When an infrared signal and an ultrasonic signal transmitted from the input pen 200 are detected, the process proceeds (step S18).

Next, the position of the leading end of the input pen 200 detected in step S16 is registered as the point A in the displayed image, the position of the leading end of the input pen 200 detected in step S18 is registered as the point B in the displayed image, and processing for correcting a detected position is performed (step S19).

When it is determined that the picture 301 on the notebook 300 has been rotated as viewed from the electronic terminal 100 in the position correction in step S19, the image displayed on the display unit 102 is rotated by the rotation angle of the picture 301 (step S20). Thus, even after correction, the horizontal and vertical directions of the picture 301 on the notebook 300 and the horizontal and vertical directions of the image 102a displayed on the display unit 102 are made to conform to each other.

After the rotation of the image has been performed in step S20, the reset mode ends and the process returns to step S11 in which handwriting input with the input pen 200 is detected and the storage and display of the detected handwriting are performed in the handwriting display mode. In the handwriting display mode after the reset mode, position detection reflecting the position correction in step S19 is performed.

Next, an example of processing for setting the point A in step S15 in the flowchart illustrated in FIG. 5 and an example of processing for setting the point B in step S17 in the flowchart illustrated in FIG. 5 will be described with reference to FIG. 6.

Figure 6:
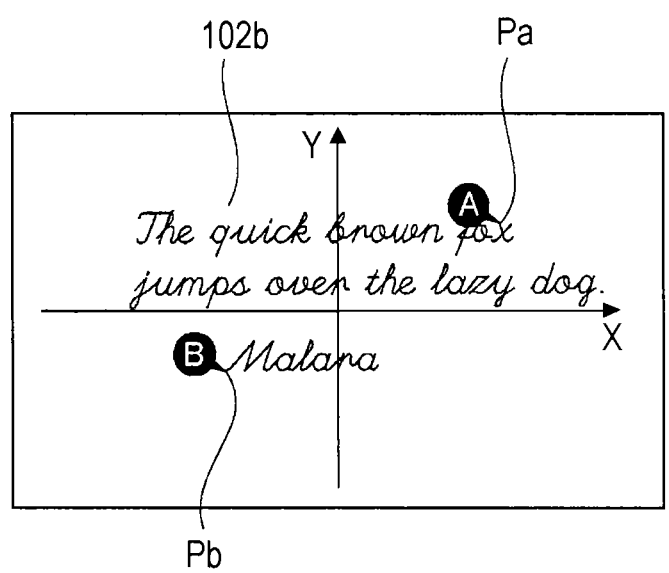
FIG. 6 is a diagram describing a display example of touch points at the time of correction according to an embodiment of the present disclosure.

FIG. 6 is a diagram illustrating an image 102b that is input by a pen and is displayed on the display unit 102. On the image 102b in FIG. 6, characters are displayed.

As illustrated in FIG. 6, on the displayed image, an X direction (horizontal direction) and a Y direction (vertical direction) are set. At that time, a substantially center of the displayed image, that is, an intersection of an X directional axis and a Y directional axis illustrated in FIG. 6, is set as an origin at which an evaluation value is 0. The farther from the origin in the X and Y directions, the larger the evaluation value. On the left side of the origin in the X direction and the lower side of the origin in the Y direction, the evaluation value becomes negative. The X directional axis and the Y directional axis are illustrated in FIG. 6 to describe the evaluation value, and are not actually displayed on an image on the display unit 102.

The control unit 117 checks a value obtained by adding an evaluation value in the X direction and an evaluation value in the Y direction at each pixel on a displayed line corresponding to handwriting on the image 102b, sets a point at which the maximum value is obtained as a point Pa that is the point A, and sets a point at which the minimum value is obtained as a point Pb that is the point B. Accordingly, in the example in FIG. 6, the upper right end and the lower left end of handwriting in the image are the points A and B, respectively.

In the example in FIG. 6, in order to make the points A and B identifiable, the character of A in a circle and the character of B in a circle are displayed at corresponding positions.

The evaluation value determination processing illustrated in FIG. 6 is merely an example, and another processing for determining the points A and B may be performed. For example, an evaluation value in only one of the X direction and the Y direction may be used, and a point at which the maximum evaluation value is obtained and a point at which the minimum evaluation value is obtained may be set as the points A and B, respectively.

For example, when the evaluation value in the Y direction is used, the upper end and the lower end of handwriting are the points A and B, respectively. When the evaluation value in the X direction is used, the right end and the left end of handwriting are the points A and B, respectively.

These evaluation values may not be used, and randomly selected two points on a line corresponding to handwriting on an image may be set as the points A and B. In this case, it is desired that the points A and B be apart from each other by a certain distance.

Alternatively, when there is a single (independent) point or the intersection of a plurality of lines in handwriting on an image, the independent point or the intersection may be selected as the point A or B. By selecting the independent point or the intersection, a user can easily check the position of the point and points an input pen at the point. For example, a point on the upper side of "i" or the intersection of a vertical line and a horizontal line of "t" may be set as the point A or B.

Exemplary cases in which correction processing in the reset mode described with reference to the flowchart in FIG. 5 is actually performed will be described with reference to FIGS. 7 and 8.

Figure 7A:
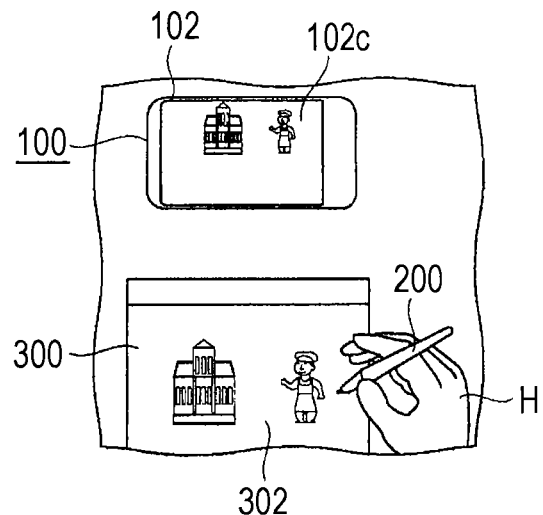
FIG. 7 includes diagrams describing an exemplary case at the time of start of a correction process according to an embodiment of the present disclosure.

FIG. 7A illustrates an exemplary case in which the electronic terminal 100 is placed on the far side of the notebook 300, an image 102c that is the same as a picture 302 drawn on the notebook 300 with the input pen 200 is displayed on the display unit 102, and the displayed image is stored.

Figure 7B:
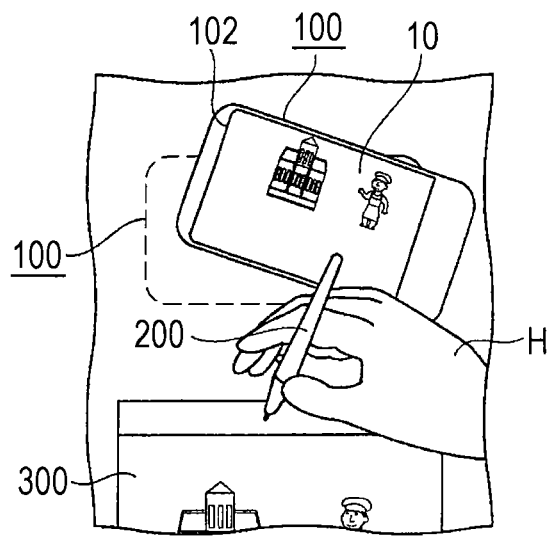

It is assumed that a hand H of a user holding the input pen 200 is brought into contact with the electronic terminal 100 and the electronic terminal 100 is obliquely moved as illustrated in, for example, FIG. 7B in a state the display and storage of handwriting illustrated in FIG. 7A are performed. At that time, the movement of the electronic terminal 100 is detected on the basis of data of detection performed by the acceleration sensor 114 in the electronic terminal 100 and the reset mode is set.

When the electronic terminal 100 is moved slightly or very slowly, the reset mode may not be set on the basis of data of acceleration detection. In such a case, the reset mode may be compulsorily set by a user's operation.

FIG. 8 is a diagram illustrating an exemplary case after the reset mode has been set.

Figure 8A:
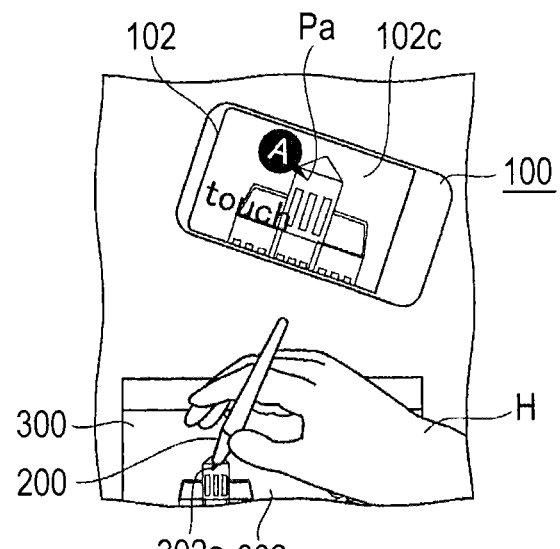
FIG. 8 includes diagrams describing an exemplary case at the time of a correction process according to an embodiment of the present disclosure.

When the reset mode is set, the point Pa (the point A) is displayed on the image 102c on the display unit 102 as illustrated in FIG. 8A. A user sees the position of the point Pa (the point A), determines the position of the point Pa (the point A) on the picture 302 on the notebook 300, and touches a determined point 302a with the leading end of the input pen 200.

Figure 8B:
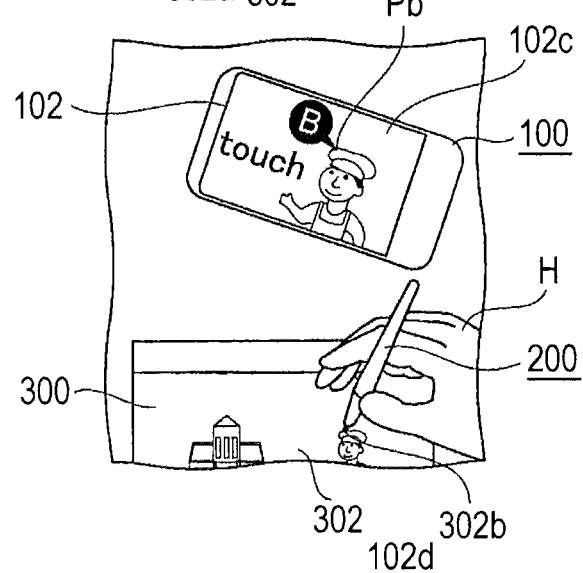

After the point A has been touched, the point Pb (the point B) is displayed on the image 102c on the display unit 102 as illustrated in FIG. 8B. The user sees the position of the point Pb (the point B), determines the position of the point Pb (the point B) on the picture 302 on the notebook 300, and touches a determined point 302b with the leading end of the input pen 200.

When the touches of the points A and B illustrated in FIGS. 8A and 8B have been completed, a corrected position is calculated in the electronic terminal 100. After the corrected position has been calculated and correction has been performed, the handwriting of the picture 302 handwritten on the notebook 300 with the input pen 200 is continuously detected by the electronic terminal 100 and newly input handwriting is added to a displayed image 102d as illustrated in FIG. 8C.

Figure 8C:
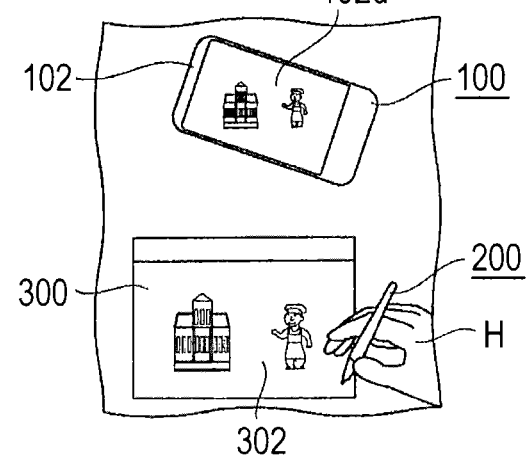

By performing the image rotation processing in step S20 in the flowchart illustrated in FIG. 5, the picture 301 on the notebook 300 and the displayed image 102d remain parallel even if the electronic terminal 100 is obliquely moved as illustrated in FIG. 8C. The image rotation processing in step S20 may not be performed.

On the image 102c including the point A in FIG. 8A and the image 102c including the point B in the FIG. 8B, the portions of these images surrounding points A and B may be enlarged to make the selection of these points clearer for the user.

As described previously, when the electronic terminal 100 according to this example is moved by some impact during detection of the position thereof relative to the input pen 200 and storage and display of a handwriting image written with the input pen 200, the correction mode is automatically set. Accordingly, since correction processing is automatically started, detection of the relative position can be continuously performed under the same condition. A handwriting detection condition is not therefore disturbed by the movement of the electronic terminal 100.

In the processing for determining two points to be touched by a user at the time of the correction processing, as illustrated in, for example, the example in FIG. 6, it is possible to automatically select points easily recognizable to the user using evaluation values in the horizontal and vertical directions which are obtained on a line corresponding to handwriting.

Furthermore, as illustrated in FIG. 8C, it is possible to keep a picture or a character string being written with the input pen 200 and an image displayed on the electronic terminal 100 parallel to each other by rotating the displayed image on the basis of a state of correction of the relative position.

6. Description of Distance Display Process

Next, a process for measuring the distance between certain two points and displaying the distance using the electronic terminal 100 according to this example and the input pen 200 in a measurement mode will be described.

Figure 9:
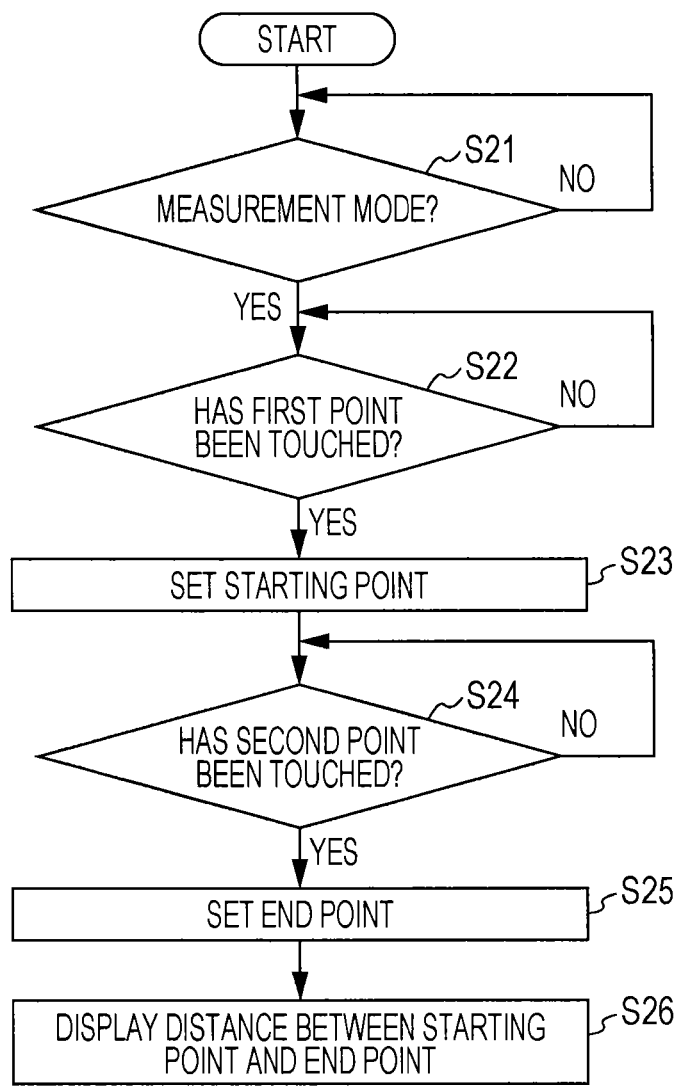
FIG. 9 is a flowchart illustrating an example of a distance measurement process according to an embodiment of the present disclosure.

The process in the measurement mode is performed in accordance with a procedure illustrated in a flowchart in FIG. 9 under the control of the control unit 117.

First, the control unit 117 determines whether the measurement mode has been set by the operation unit 119 (step S21). When the measurement mode is not set, the control unit 117 waits until the measurement mode is set. When it is determined that the measurement mode has been set, it is determined whether a first point that is a measurement starting point has been touched by the input pen 200 (step S22). When it is determined that the touch of the first point has been detected, the detected point is set as a starting point (step S23).

Subsequently, it is determined whether a second point that is a measurement end point has been touched by the input pen 200 (step S24). When it is determined that the touch of the second point has been detected, the detected point is set as an end point (step S25). The distance between the starting point and the end point is determined, and the determined distance is displayed on the display unit 102 (step S26).

Figure 10:
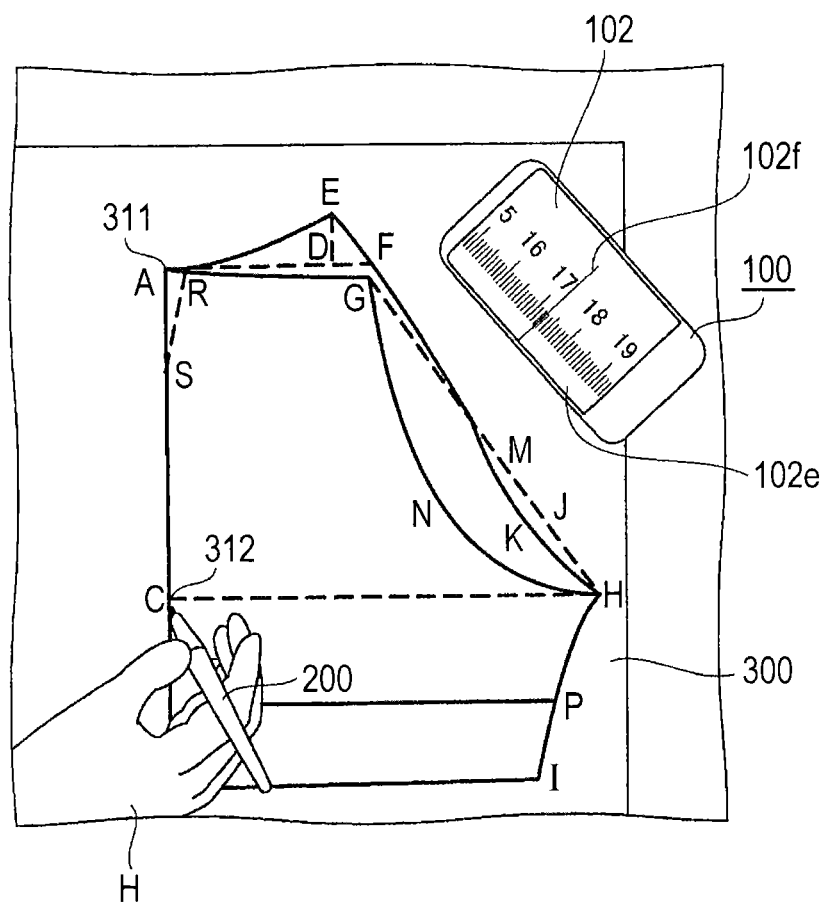
FIG. 10 is a diagram describing a display example of a distance according to an embodiment of the present disclosure.

FIG. 10 is a diagram illustrating an example of a processing state in the measurement mode.

For example, as illustrated in FIG. 10, it is assumed that a specific point 311 in a figure written on the notebook 300 is set as a starting point and another specific point 312 is set as an end point. At that time, the electronic terminal 100 detects the positions of these points and calculates the distance between the positions.

In the example illustrated in FIG. 10, a scale image 102f is displayed on the display unit 102 in the electronic terminal 100 and the scale image 102f indicates the calculated distance.

Thus, it is possible to measure the distance between certain two points and display the measured distance using a position detection function of the electronic terminal 100. The electronic terminal 100 functions as an electronic measuring device. A distance is presented in a scale in the example in FIG. 10, but may be numerically represented.

7. Modification

In the example illustrated in FIG. 1, the casing 101 of the electronic terminal 100 contains the sensors 111, 112, and 113. A casing containing the sensors 111, 112, and 113 and the body of the electronic terminal 100 may be separately formed.

Figure 11:
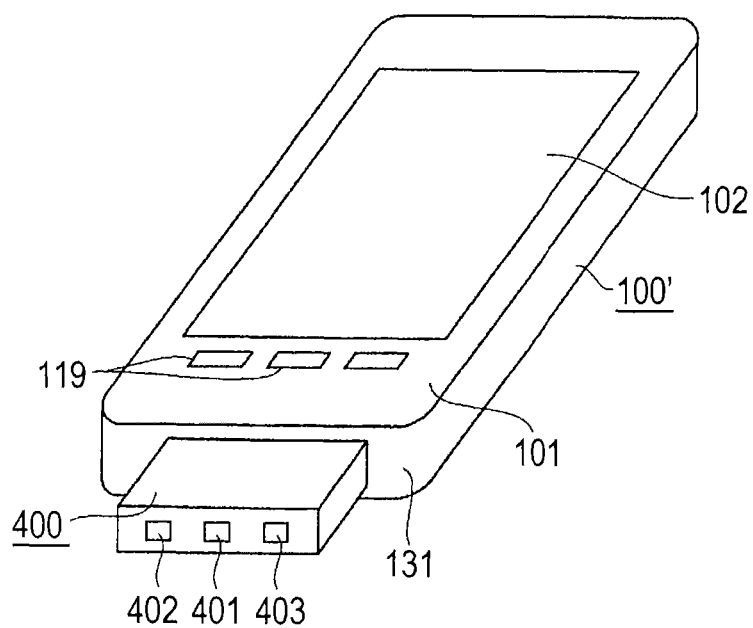
FIG. 11 is a perspective view illustrating an exemplary configuration of an electronic terminal according to another embodiment of the present disclosure.

For example, as illustrated in FIG. 11, in an electronic terminal 100', an adaptor connection unit 131 is formed on the side surface of a casing and a receiving adaptor 400 is connected to the adaptor connection unit 131. The electronic terminal 100' is the same as the electronic terminal 100 illustrated in FIG. 2 except that the infrared sensor 111, the first ultrasonic sensor 112, and the second ultrasonic sensor 113 are not disposed and the adaptor connection unit 131 is disposed.

An infrared sensor 401, a first ultrasonic sensor 402, and a second ultrasonic sensor 403 are disposed in the receiving adaptor 400 illustrated in FIG. 11. The detection outputs of the sensors 401, 402, and 403 are supplied to the electronic terminal 100'. For example, power for the sensors 401, 402, and 403 in the receiving adaptor 400 are supplied from the electronic terminal 100' via the adaptor connection unit 131.

In the electronic terminal 100', the position of a leading end of an input pen is calculated on the basis of pieces of detection data acquired by the sensors 401, 402, and 403 in the receiving adaptor 400 and correction processing is started when acceleration detected in the electronic terminal 100' exceeds a threshold value.

Using the configuration illustrated in FIG. 11, this example can be applied to an electronic terminal including no infrared sensor and no ultrasonic sensor and versatility can be increased.

The position calculation processing may be performed in the receiving adaptor when each sensor performs detection, and data of the calculated position may be transmitted to an electronic terminal. In this case, when an acceleration sensor in the electronic terminal detects that acceleration has exceeded a threshold value, the electronic terminal may transmit an instruction for setting a reset mode to the receiving adaptor and processing in the reset mode may be performed in the receiving adaptor.

In the above-described examples, a radiotelephone terminal is used as an electronic terminal. A configuration and processing according to the present disclosure may be applied to various electronic terminals such as an electronic terminal having a function of reproducing music or video for portable devices and an electronic terminal having a function of playing a video game. Alternatively, a handwriting input apparatus having only a function of detecting handwriting using a writing implement such as an input pen may be used.

Each sensor may be disposed in a general-purpose information processing apparatus such as a personal computer apparatus, the output of the sensor may be processed in the information processing apparatus, and similar processing may be performed by executing a program (software) for correction processing installed in the general-purpose information processing apparatus.

Figure 2:
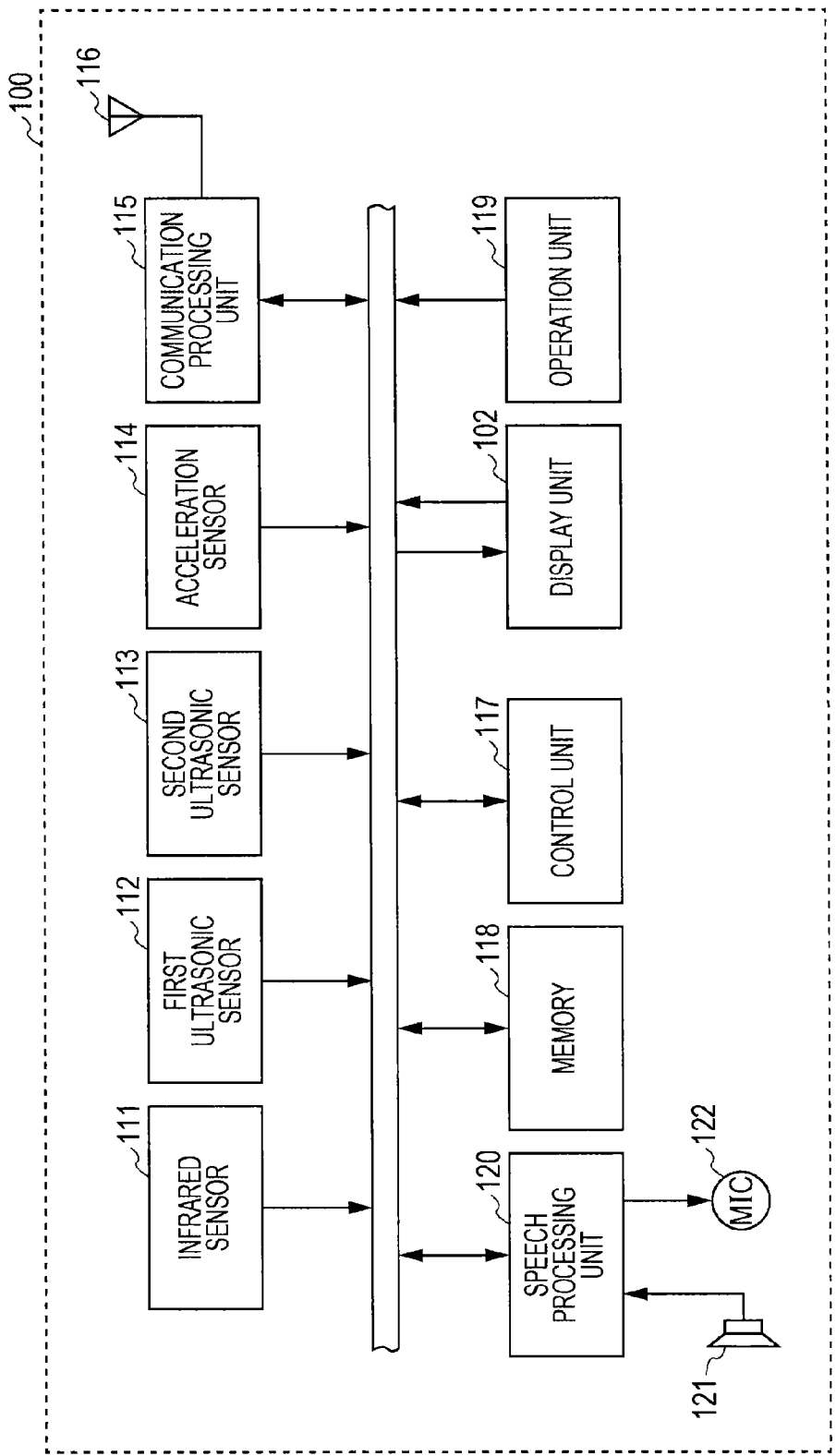
FIG. 2 is a block diagram illustrating an exemplary configuration of an electronic terminal according to an embodiment of the present disclosure.

When the radiotelephone terminal illustrated in FIG. 2 is employed, a program using detection data acquired by each sensor may be externally supplied to the radiotelephone terminal and processing according to the present disclosure may be performed in accordance with the program.

In the above-described description, in order to detect the position of an input pen, an infrared signal and an ultrasonic signal are transmitted from the input pen. Other types of signals may be used. That is, two types of signals having different transmission speeds may be used in combination. For example, an infrared signal and a radio signal in the range of several GHz to several hundred MHz may be used in combination. Alternatively, instead of an infrared signal, a visible light signal may be used.

In the correction process illustrated in the flowchart in FIG. 5, the reset mode is started when acceleration is applied to a terminal or a user's operation is performed. Only one of these conditions may be used as the reset mode start condition. For example, only when acceleration is applied to a terminal, the reset mode may be started. Alternatively, only when a user's operation is performed, the reset mode may be started.

The input pen 200 illustrated in FIGS. 1 and 3 is merely an example. Various writing implements can be used under the condition that they have a function of transmitting two types of signals to a terminal.

The invention claimed is:

1. An information processing apparatus comprising:
a first sensor that receives a first type of signal;
a second sensor that receives a second type of signal;
a third sensor that receives the second type of signal;
an acceleration sensor that detects an acceleration externally applied to the information processing apparatus; and
circuitry configured to
calculate a position of a source from which a signal of the first type and a signal of the second type are transmitted based on a first time at which the signal of the first type is received at the first sensor, a second time at which the signal of the second type is received at the second sensor and a third time at which the signal of the second type is received at the third sensor;
control a display to display an image corresponding to a path obtained based on changes in position of the source; and
perform correction processing to correct a position of the information processing apparatus relative to the source by controlling the display to sequentially display a first mark and a second mark on the image displayed by the display when it is determined that an output of the acceleration sensor exceeds a predetermined threshold value.

2. The information processing apparatus of claim 1, wherein the first sensor is an infrared sensor that receives an infrared signal transmitted from the source.

3. The information processing apparatus of claim 1, wherein the second sensor and the third sensor are ultrasonic sensors that receive an ultrasonic signal transmitted from the source.

4. The information processing apparatus of claim 1, wherein the information processing apparatus is a mobile terminal including a housing having top, bottom and side surfaces.

5. The information processing apparatus of claim 4, wherein the first sensor is located substantially in a center of a side surface of the housing.

6. The information processing apparatus of claim 5, wherein the second and third sensors are located on the side surface of the housing on opposite sides of the first sensor and at equal distances from the first sensor.

7. The information processing apparatus of claim 1, wherein the circuitry is configured to calculate the position based on a difference between the first time and the second or third times, and a difference between the second and third times.

8. The information processing apparatus of claim 1, wherein the circuitry is configured to compare the output of the acceleration sensor to the predetermined threshold value.

9. The information processing apparatus of claim 1, wherein upon displaying the first mark a next position calculated by the circuitry is registered as a first position corresponding to the first mark.

10. The information processing apparatus of claim 9, wherein upon displaying the second mark a next position calculated by the circuitry is registered as a second position corresponding to the second mark.

11. The information processing apparatus of claim 10, wherein the circuitry is configured to control the display to rotate the displayed image based on the first position corresponding to the first mark and the second position corresponding to the second mark.

12. The information processing apparatus of claim 1, wherein the first mark and the second mark are selected from among points on the path in the displayed image and correspond to an evaluation value in a horizontal direction and an evaluation value in a vertical direction.

13. The information processing apparatus of claim 1, wherein the first mark and the second mark are randomly selected points on the path in the displayed image.

14. The information processing apparatus of claim 1, wherein the circuitry is configured to control the display to display an image indicating a distance between two points.

15. An information processing apparatus comprising:
a first sensor that receives a first type of signal;
a second sensor that receives a second type of signal;

a third sensor that receives the second type of signal;

circuitry configured to calculate a position of a source from which a signal of the first type and a signal of the second type are transmitted based on a first time at which the signal of the first type is received at the first sensor, a second time at which the signal of the second type is received at the second sensor and a third time at which the signal of the second type is received at the third sensor; and control the display to display a measurement value corresponding to a difference between a first calculated position of the source and a second calculated position of the source.

16. A method performed by an information processing apparatus, the method comprising:

receiving a first type of signal transmitted from a source at a first sensor at a first time;

receiving a second type of signal transmitted from a source at a second sensor at a second time;

receiving the second type of signal transmitted from the source at a third sensor at a third time;

calculating a position of the source based on the first time, the second time, and the third time; and controlling a display to display a measurement value corresponding to a difference between a first calculated position of the source and a second calculated position of the source.

17. A non-transitory computer-readable medium including computer program instructions, which when executed by an information processing apparatus, causes the information processing apparatus to perform a method, the method comprising:

receiving a first type of signal transmitted from a source at a first sensor at a first time;

receiving a second type of signal transmitted from a source at a second sensor at a second time;

receiving the second type of signal transmitted from the source at a third sensor at a third time;

calculating a position of the source based on the first time, the second time, and the third time; and controlling a display to display a measurement value corresponding to a difference between a first calculated position of the source and a second calculated position of the source.

* * * * *